Patented Sept. 11, 1923.

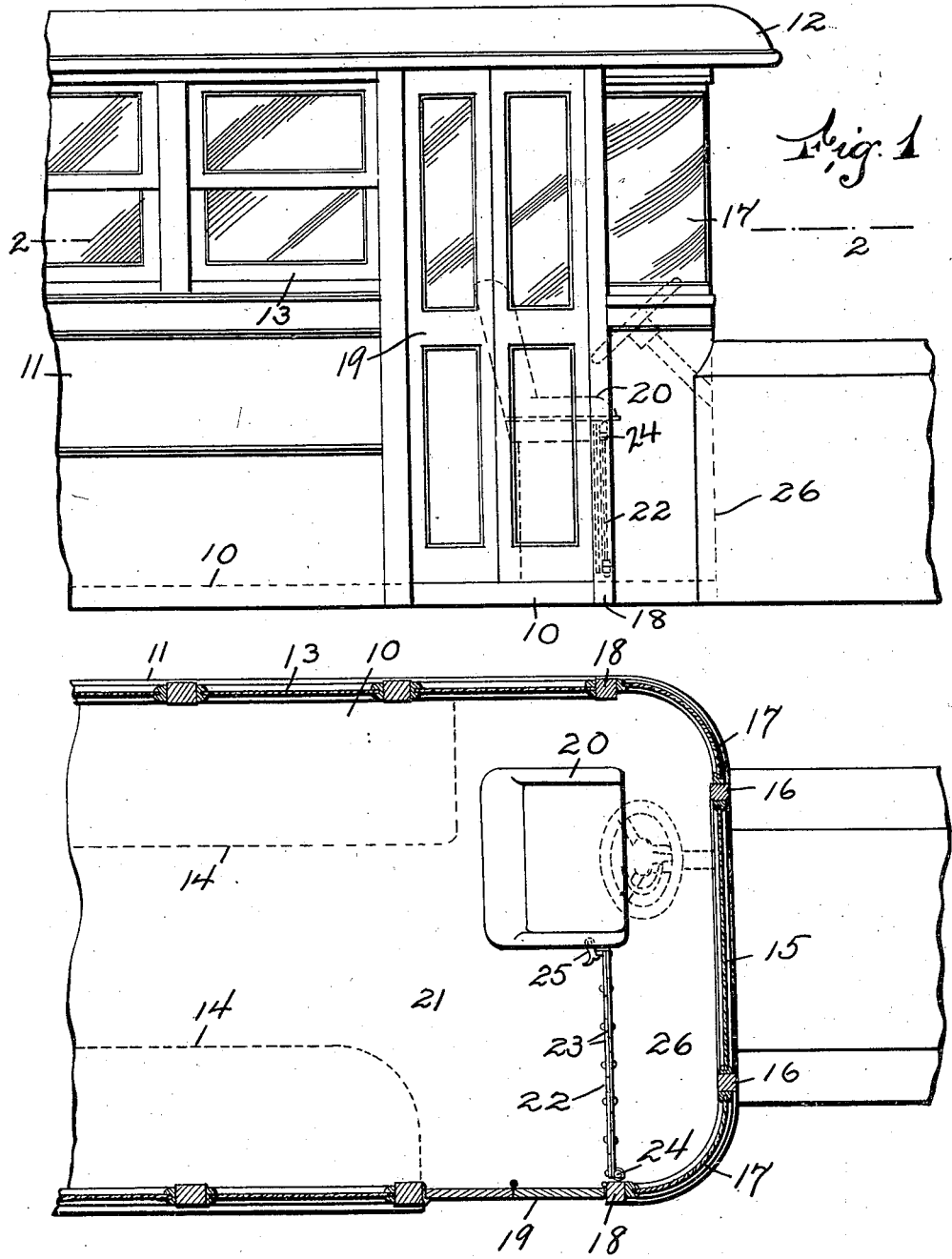

1,467,376

UNITED STATES PATENT OFFICE.

DAVID J. HALL, OF NEWARK, NEW JERSEY.

BUS BODY.

Application filed October 6, 1920. Serial No. 414,995.

*To all whom it may concern:*

Be it known that I, DAVID J. HALL, a citizen of the United States, and a resident of Newark, county of Essex and State of New Jersey, have invented certain new and useful Improvements in Bus Bodies, of which the following is a specification.

This invention relates to a bus body and is designed to provide a bus that contributes to the safety of the passengers in that it is so constructed as to give the maximum of capacity for passengers, but at the same time to insure a good view for the driver from the front and to the sides.

In localities where busses are used it is customary to have a one-man vehicle, that is, the driver also collects the fare, and to enable this the entrance and exit door, the same door answering both purposes, is placed at the side toward the front of the vehicle, so that passengers entering or leaving have easy access to the driver for the purpose of paying fare. Busses, since they travel on the right side of the street, have this door on the right side, and since the busses travel close to the right hand curb it is essential that a good view be had of intersecting streets because vehicles in the transverse or intersecting street have the nearest approach from the right side.

I have, therefore, devised a bus in which the front and closed end is so constructed that the driver is insured a clear view of approaches from the right and left to the street on which he is travelling.

A further advantage of this bus is that a space can be reserved adjacent to the driver's seat by means of a barrier, preferably a folding one, that prevents passengers entering the space to interefere with this oblique or side vision of the driver, and at the same time provides a compartment for the storage of grips, hand bags and parcels which can be deposited by passengers entering the car, and the remainder of the compartment is thereby given up for the exclusive reception of passengers.

The invention is illustrated in the accompanying drawing, in which I show a form of bus body illustrating my invention, and in which Figure 1 is a side view of the front part of a bus body made according to my invention, and Figure 2 is a section taken on line 2—2 in Figure 1.

The bus body comprises a frame 10, sides 11 and a roof 12, the sides being usually supplied with windows 13, and has any form of benches or seats 14 for passengers. The front end is enclosed and consists of a front window 15 which can be made in the usual form of wind-shield supported between the front posts 16, the side portions of the front comprising windows that extend to the side and to the rear, merging with the sides of the bus body, in the form shown these windows being curved, as at 17, and being supported by the posts 16 and the posts 18 at the front end of the sides.

The door 19 is placed at one side, usually on the right side, and in the drawing I show a folding door, common in this type of vehicle, the post 18 acting as a support for the door 19. I place the driver's seat 20 on the side opposite the door, usually the left hand side, this driver's seat being so located as to provide a space 21 through which passengers can pass for entering or leaving the car.

Between the seat and the side edge of the body I arrange a barrier 22, which can be in the form of a rail or gate, the form shown comprising a collapsible barrier formed of crossed strips 23 arranged in the form of toggles and secured at one end, as at 24, to the post 18 and being adapted to be detachably secured, such as by the latch 25, to the driver's seat. This forms a space 26 between the barrier and the front of the car in which suit-cases, grips, parcels and other impedimenta carried by passengers can be deposited and in no way interfere with either the comfort of the passengers or the operation of the car by the driver.

It will be seen that there is insured a clear space for vision defined in general by the line of the barrier 22 and the driver's seat 20, so that the driver can observe through the window 15 to the front, and through the window 17 to the right and to the left, and even when the bus is crowded the barrier 22 prevents passengers getting in the way of the driver's view of busses approaching on the right on intersecting streets, which is necessary since in crowded cities there is not much room for a vehicle travelling on the right side of the street to avoid collision with vehicles approaching from narrow intersecting streets, and it is essential, as a measure of safety, that the driver not only have a clear vision, but that his attention be not detracted from driving the vehicle by requesting or insisting that passengers do not occupy the space at the front of the car opposite his seat.

I claim:

A bus body having an enclosed front end, said end having windows at the front and corners and merging with the sides to form a bay, a door at one side of the body near the front, a fixed driver's seat at the opposite side of the vehicle from the door a steering wheel in front of the driver's seat, thereby necessitating the driver's remaining at a distance from the front of the body, and a low folding barrier extending from the door side of the body to the seat, whereby passengers are kept from obstructing the driver's view to the side and a compartment for the storage of baggage is provided.

In testimony that I claim the foregoing, I have hereto set my hand, this 4th day of October, 1920.

DAVID J. HALL.